United States Patent [19]

O'Malley

[11] 4,348,431
[45] Sep. 7, 1982

[54] PROCESS FOR COATING PLASTIC FILMS

[75] Inventor: William J. O'Malley, Killington, Vt.

[73] Assignee: General Electric Company, New York, N.Y.

[21] Appl. No.: 235,901

[22] Filed: Feb. 19, 1981

[51] Int. Cl.$^3$ .............................................. B05D 3/02
[52] U.S. Cl. ............................. 427/387; 106/287.14; 106/287.15; 106/308 Q; 427/393.5; 428/412; 428/447; 428/480
[58] Field of Search ............... 260/29.2 M, 37 SB; 106/287.14, 287.15, 308 Q; 427/387, 393.5; 428/447, 451, 412, 480

[56] References Cited

U.S. PATENT DOCUMENTS 3,986,997  10/1976  Clark ........................... 260/29.2 M
4,177,315  12/1979  Ubersax ........................... 428/336
4,211,823  7/1980   Suzuki et al. ................. 260/29.2 X
4,248,751  2/1981   Willing ......................... 260/29.2 M
4,258,102  3/1981   Trauer et al. ................. 260/29.2 X Primary Examiner—Michael R. Lusignan
Attorney, Agent, or Firm—Hedman, Casella, Gibson & Costigan

[57] ABSTRACT

Plastic films are (i) continuously coated with composition comprising a dispersion of colloidal silica in an aliphatic alcohol-water solution of the partial condensate of a silanol to which there has been added a small amount of a buffered latent silanol condensation catalyst and a minor proportion, sufficient to promote flow, of a $\beta$-hydroxy ketone compound and (ii) thereafter transported to a heated zone for rapid curing.

14 Claims, No Drawings

PROCESS FOR COATING PLASTIC FILMS

BACKGROUND OF THE INVENTION

This invention relates to an improved process for continuously providing plastic films with protective coatings. More particularly, it relates to a method for using a silicone resin coating composition under conditions which make the use of conventional film converting machinery practicable.

Silicone resins, especially silicone hard coating resins, are notoriously slow curing materials. The latter comprise aqueous compositions based on a dispersion of colloidal silica in an aliphatic alcohol-water solution of the partial condensate of a silanol. These find use as mar and scratch resistant coatings for plastic substrates in the form of sheets and plaques, such as polycarbonate and acrylic windows in transportation equipment, and in plastic lenses, such as acrylic eye-glass lenses, and the like. Such compositions and their use are described, for example, in Clark, U.S. Pat. Nos. 3,986,997; in Ubersax, 4,177,315; and in the co-pending U.S. patent applications of James T. Conroy, Ser. No. 170,994, filed July 18, 1980, now U.S. Pat. No. 4,311,763, patented Jan. 19, 1982, and Ser. No. 172,269, filed on July 25, 1980, the disclosures of which are incorporated herein by reference.

The above-mentioned slow curing of such compositions is detrimental to their use where high line speeds are required, such as in film-coating operations. By way of illustration, uncatalyzed polysilicic acid-silanol compositions require about two minutes to reach full cure in a 150° C. forced air circulating oven. Full cure is critical because, without it, the coating will not have good adhesion to the substrate and good mar resistance.

Film converters (fabricators) process plastic films on web coating machines that are operated at line speeds of 100 feet per minute and higher. Typically, these machines have ovens 50 feet in length for use in solvent removal and/or curing of the coatings. Under these conditions, the maximum allowable processing time for a coating is 120 seconds, and usually even less, 30 seconds or so.

There has now been discovered a way to greatly accelerate the cure of such silicone hard coatings so that they can be processed at high line speeds on films such as poly(ethylene terephthalate). If, for example, an alkali alkanoate salt or a quaternary ammonium salt, e.g., acetate, are selected and added in optimum amounts as catalysts to the coating compositions, and β-hydroxyketo compounds are added to promote flow, formulations are obtained which can be cured in 25-30 seconds at 150° C. in a forced air circulating oven. Although the references cited above, in general, disclose catalytic activity with salts of the type discovered to be active herein, and the promotion of adhesion with β-hydroxyketone compounds, it is believed that it is unexpected to find that the use of catalysts in combination with flow promoters makes possible the use of such compositions in the film converting industry with its unique requirements.

SUMMARY OF THE INVENTION

Accordingly, it is a primary object of the present invention to provide a method for coating catalyzed silicone resins on thin film plastic substrates.

Another object of this invention is to provide a method for applying an abrasion resistant surface on thin plastic film substrates.

Still another object of this invention is to provide a method for applying a catalyzed silicone resin coating composition to thin films of thermoplastic polymers, especially polyesters and aromatic polycarbonates.

A still further object of this invention is to provide a method for rapidly curing a silicone resin coating composition on a continuously moving thin plastic film.

These and other objects are accomplished herein by providing a method for coating plastic films which comprises the steps of (i) applying to a moving web of said plastic film an aqueous composition comprising a dispersion of colloidal silica in an aliphatic alcohol-water-solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, said composition including a small, catalytic amount of a buffered latent silanol condensation catalyst and a minor proportion, sufficient to promote flow, of a β-hydroxyketone compound; and (ii) transporting said film into a zone of elevated temperature sufficient to effect substantially complete cure of the silanol in less than about 120, and preferably about 30, seconds.

DETAILED DESCRIPTION OF THE INVENTION

The coating compositions used in the method of this invention are prepared by hydrolyzing an alkyltrialkoxysilane or aryltrialkoxysilane of the formula $RSi(OR)_3$, wherein R is alkyl of from 1 to 3 carbon atoms or aryl, such as phenyl, in an aqueous dispersion of colloidal silica, and formulating the catalyst and β-hydroxyketone compound into the resultant reaction product.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. In preferred compositions, wherein the pH of the coating compositions is on the basic side, basic colloidal silica sols are selected. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silica having an alkali content of less than 0.35% (calculated as $Na_2O$) are preferred. Moreover, colloidal silicas having average particle size of from 10 to 30 millimicrons are also preferred. A particularly preferred one for the purposes herein is known as Ludox LS, sold by duPont Company.

In accordance with this invention, the aqueous colloidal silica dispersion is added to a solution of a small amount of glacial acetic acid or alternatively alkyltriacetoxysilane in alkyltrialkoxysilane or aryltrialkoxysilane. The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 24 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include aliphatic alcohols such as methanol, ethanol, propanol, isopropanol, n-butylalcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve, etc., in minor amounts like no more than 20 weight percent of the cosolvent system, can also be employed. The solids content of the coating composition in this invention is generally preferred to be in the range of from about 18 to 25%, most preferably about 18%, by weight of the total composition. The pH of the resultant coating composition is in the range of from about 3 to about 8, preferably from 7.1 to about 7.8, and especially preferably higher than 7.2 If necessary, dilute base, such as ammonium hydroxide, or weak acid, such as acetic acid, may be added to the composition to adjust the final pH to this desired range.

The coating compositions prepared as described above will cure on a substrate at temperatures of, for example, 150° C. in more than about 2 minutes without the aid of an added curing catalyst. However, this is unsuitable for conventional film coating machinery. To use more rapid curing conditions, it is essential to add buffered latent condensation catalysts in accordance with this invention. Included in this class of catalysts are alkali metal salts of carboxylic acids, such as sodium acetate, potassium acetate, potassium formate, and the like. Amine carboxylates, such as dimethylamine acetate, ethanolamine acetate, dimethylaniline formate, and the like, quaternary ammonium carboxylates such as tetramethylammonium acetate, benzyltrimethylammonium acetate, metal carboxylates, like tin octoate and amines such as triethylamine, triethanolamine, pyridine, and the like are also contemplated curing catalysts herein. Especially preferred are potassium and tetra(-lower)alkylammonium salts of monoalkanoic acids having from 2 to 6 carbon atoms, such as potassium acetate, potassium n-propionate, potassium isopropionate, potassium n-butyrate, potassioum t-butyrate, potassium n-pentanoate, potassium n-hexanoate, tetramethylammonium acetate, tetrahexylammonium acetate, and the like. Also preferred is benzyltrimethylammonium acetate. These can be used alone, or in admixture.

The amount of curing catalyst can be varied within a wide range, depending upon the desired curing conditions. However, in general, catalyst in the amounts of from about 0.05 to about 5.0 weight percent, preferably about 0.1 to 2.0 weight percent, based on the solids content of the composition can be used. Compositions containing catalysts in these amounts can be cured on the film in a relatively short time, e.g., less than 60 seconds, at temperatures in the range of from about 75°–150° C. to provide a transparent abrasion resistant surface coating. It facilitates measurement and handling to add the catalyst salts as a solution or dispersion in the aliphatic alcohol used to make the composition. It is convenient to add the catalyst as a 5% solution in methanol, for example.

It has been found herein that it is critical to include a β-hydroxyketone compound in the coating composition. This β-hydroxyketone compound may be added to the composition before, during or after the hydrolysis reaction. Preferably, however, it is added to the composition after the initial solids content has been diluted with alcohol. The β-hydroxyketone compound acts as a flow promoter. For the purposes of this invention, the β-hydroxyketone compound is employed in an amount of from about 2.5 to about 15% by weight of the composition. Most advantageous results are achieved when the compound is utilized at about 5 to 10% by weight of the composition. In any case, there are salutary effects on abrasion resistance, scribed adhesion, ultraviolet light resistance, moisture and humidity resistance of the coating.

More spcficially, some of the β-hydroxyketone compounds useful in the practice of the invention herein are those having the formula:

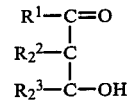

wherin $R^1$ is a monovalent hydrocarbon radical of from 1 to 8 carbon atoms and $R^2$ and $R^3$ are, independently, a monovalent hydrocarbon radical of from 1 to 18 carbon atoms or hydrogen.

Among the hydrocarbon radicals represented by $R^1$, $R^2$ and $R^3$ in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. In the above formula, $R^1$ is preferably methyl, $R^2$ each are preferably hydrogen, and $R^3$ each are preferably methyl. The preferred compound is also known as diacetone alcohol, which is commercially available. Other suitable compounds of the above formula can easily be made by those skilled in this art.

In many cases, it is advantageous to include a polysiloxane polyether copolymer in the coating composition. This polysiloxane polyether copolymer may be added to the composition after the initial solids content has been diluted with alcohol. The polysiloxane polyether copolymer acts as a flow control agent and thereby prevents flowmarks, dirtmarks, and the like, on the surface of the substrate to which the coating is subsequently applied. For the purpose of these preferred compositions, the polysiloxane polyether copolymer is employed in an amount of from about 2.5 to about 15% by weight of the total solids of the composition. Most advantageous results are achieved when the copolymer is utilized at about 4% by weight of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive has been found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the alcohol-water co-solvent system of the compositions herein and becomes a permanent part of the cured coating, not removed by washing, even with soap and water.

More specifically, some of the polysiloxane polyether copolymers useful in the practice of the preferred embodiments herein are liquid organopolysiloxane copolymers having the formula:

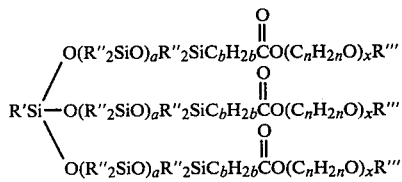

where R' and R" are monovalent hydrocarbon radicals; R''' is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R' and R" in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. R''' is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula, R' is preferably methyl, R" is preferably methyl, R''' is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141, both sold by General Electric Company, BYK-300, sold by Mallinckdrodt, L-450, sold by Union Carbide, and DC-190, sold by Dow Corning.

The alkyltriacetoxysilane or glacial acetic acid is used to buffer the basicity of the initial two liquid phase reaction mixture and thereby also temper the hydrolysis rate. While the use of glacial acetic acid is preferred herein, alkyltriacetoxysilane may be used in its place, as well as other acids such as organic acids like propionic, butyric, citric benzoic, formic, oxalic, and the like. Alkyltriacetoxysilanes wherein the alkyl group contains from 1-6 carbon atoms can be used, alkyl groups having from 1 to 3 carbon atoms being preferred.

The silanetriols, RSi(OH)$_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which upon hydrolysis generate the silanetriols and further liberate the corresponding alcohol. In this way, at least a portion of the alcohol content present in the final coating composition is provided. Upon the generation of the hydroxyl substituents to form

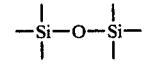

bonding occurs. This condensation takes place over a period of time and is not exhaustive but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of CH$_3$Si(OH)$_3$ and, depending upon the input of ingredients to the hydrolysis reaction, minor portions of partial condensate can be obtained, for example, from the condensation of CH$_3$Si(OH)$_3$ with C$_2$H$_5$Si(OH)$_3$ or C$_3$H$_7$Si(OH)$_3$; CH$_3$Si(OH)$_3$ with C$_6$H$_5$Si(OH)$_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The coating compositions of the present invention are to be applied to a variety of thin substrates by continuous coating methods, such as by passing a moving web of substrate through a reverse roller treater, or a gravure roller system, or over wire wound rods, entirely conventionally, to apply the catalyzed composition, then transporting to a heating zone to effect cure. Substrates which are especially contemplated herein are transparent and non-transparent films. More particularly, these are plastic films, especially synthetic organic polymeric substrates such as acrylic polymers, like poly (methylmethacrylate), polyesters, such as poly (ethylene terephthalate), poly(butylene terephthalate), etc., aromatic polycarbonates, such as poly (bisphenol A carbonate), polyamides, polyimides, acrylonitrile-styrene copolymers, styrene-acrylonitrile-butadiene copolymers, polyvinyl chloride, poly (vinylidene chloride), butyrates, polyetheylene, and the like. The method of this invention is especially useful for coating polyesters, such as the polyetheylene terephthalate film known as American Hoechst's HOSTAPHAN ® Type 4500 "adhereable" film, and polycarbonates, such as General Electric Company's LEXAN ®.

By choice of the proper formulation, application conditions and pretreatment, including the use of primers, the coatings can be adhered to substantially all plastic films. A hard coating having all of the aforementioned characteristics and advantages is obtained by the removal of the solvent and volatile materials. The term substantial complete cure means thorough condensation of residual silanols in the partial condensate. This cure results in the formation of alkyl or methyl-substituted silsequioxane ($RSiO_{3/2}$). In the finished cured coating, the ratio of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2-10 micron thickness are generally utilized.

In order that those skilled in the art may better understand how to practice the present invention, the following examples are given by way of illustration and not by way of limitation.

EXAMPLE 1

A hard coat base composition is prepared. 22.1 parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.6% and is diluted to about 20% solids with the addition of isobutanol. Eight-tenths of a gram (4% of solids) of SF-1066 (polysiloxane polyether copolymer, sold by G.E.) is thoroughly mixed with 99 grams of the resultant composition. The composition has a pH of higher than 7.2.

To 900 parts of the composition is added 100 parts of a mixture comprising, by weight, 2 parts of anhydrous potassium acetate, 88 parts of diacetone alcohol and 10 parts of methanol. For a control, 900 parts of the composition is mixed with 100 parts of diacetone alcohol.

The uncatalyzed composition with diacetone alcohol (1A) and the catalyzed composition with diacetone alcohol (1) are rapidly coated onto a moving film of poly(ethylene terephthalate) (American Hoechst Co. Type 4500). The coated film is then transported to a heated zone for timed curing. The cured coated films are checked for resistance to scratching by rubbing with 4/0 steel wool and for adhesion by cross-hatch scribing followed by affixing and pulling with 3M No. 710 adhesive tape. The results are as follows:

| Example | Coating | Cure Time At 300° F. (148.9° C.) Seconds | Results Scratch Test/ Adhesion |
|---|---|---|---|
| 1A* (*Control) | Silicone/ Hardcoat + Diacetone Alcohol (9/1) | 120 | No scratching/ good adhesion |
| | Silicone/ Hardcoat + Diacetone Alcohol (9/1) | 60 | Slight scratching/ good adhesion |
| | Silicone/ Hardcoat + Diacetone Alcohol (9/1) | 30 | Gross scratching/ good adhesion |
| 1 (this invention) | Silicone Hardcoat + Diacetone Alcohol (9/1) + 1% KOAC | 60 | No scratching/ good adhesion |
| | Silicone Hardcoat + Diacetone Alcohol (9/1) + 1% KOAC | 30 | V. sl. scratching/ good adhesion |

It is seen that potassium acetate significantly accelerates the cure rate on poly(ethylene terephthalate). The results show utility for web coating machine speeds operating at 50-100 feet per minute. The uncatalyzed compositions are not useful at such speeds.

The compositions are refrigerated at 40° F. for 16 hours (overnight), then the coating is repeated with 30 second cure times at 300° F. The scratch test results are the same, but the procedure of Example 1, on repetition, results in a very slight loss in adhesion (less than 5%). This indicates that the catalyst reduces the shelf life of the composition somewhat and suggests that the catalyst should be added shortly before use for best results.

EXAMPLE 2

The procedure of Example 1 is repeated substituting 1% by weight of tetramethylammonium acetate for the potassium acetate. The results are as follows:

| Example | Coating | Cure Time At 300° F. ( Seconds | Results Scratch Test/ Adhesion |
|---|---|---|---|
| 1A* (*Control) | Silicone Hardcoat + Diacetone Alcohol (9/1) | 120 | No scratching/ good adhesion |
| | Silicone Hardcoat + Diacetone Alcohol (9/1) | 60 | Slight scratching/ good adhesion |
| | Silicone Hardcoat + Diacetone Alcohol (9/1) | 30 | Gross scratching/ good adhesion |
| 2 (this invention) | Silicone Hardcoat + Diacetone Alcohol (9/1) + 1% Tetramethyl- ammonium Acetate | 60 | No scratching/ good adhesion |
| | Silicone Hardcoat + Diacetone Alcohol (9/1) + | 30 | No scratching/ good adhesion |

| Example | Coating | Cure Time At 300° F. ( Seconds | Results Scratch Test/ Adhesion |
|---|---|---|---|
| | 1% Tetramethylammonium Acetate | | |
| | Silicone Hardcoat + Diacetone Alcohol (9/1) + 1% Tetramethylammonium Acetate | 25 | V. sl. scratching/ good adhesion |

The catalyzed composition used according to this invention produces a poly(ethylene terephthalate) film with excellent properties in only ¼th the time. If the composition is aged for 16 hours at 40° F. and recoated, the adhesion loss increases to 30–40%, again showing a reduction in pot life.

EXAMPLE 3

The hard coat composition is prepared as in Example 1, except that to 100 parts of the composition is added 10 parts of a mixture of 2 parts of anhydrous potassium acetate, 10 parts of methanol and 88 parts of diacetone alcohol. This is applied to a continuously moving film of 92 guage (0.9 mil) poly(ethylene terephthalate) (ICI's MELINEX ® No. 442) by use of a No. 16 wire wound rod treater. The coated film is sent to a heating zone at 275° F. for 30 seconds. The coating has excellent scratch resistance and passes the above-mentioned scribed adhesion test.

EXAMPLE 4

The procedure of Example 3 is repeated, using a primed, 5 mil film of General Electric Company's LEXAN ® poly(bisphenol A carbonate). After continuous drying and curing at 250° F. for 120 seconds, a hard coat of excellent quality is obtained.

Obviously, other modifications and variations in the present invention are possible in light of the above teachings. For example, benzyltrimethylammonium acetate can be used as a catalyst. It is therefore to be understood that changes may be made in the particular embodiments described above which are within the full intended scope of the invention defined in the appended claims.

I claim:

1. A method for coating plastic films which comprises the steps of
   (i) applying to a moving web of said plastic film an aqueous composition comprising a dispersion of colloidal silica in an aliphatic alcohol-water-solution of the partial condensate of a silanol of the formula RSi(OH)$_3$, wherein R is selected from the group consisting of alkyl having from 1 to 3 carbon atoms and aryl, at least 70 weight percent of the silanol being CH$_3$Si(OH)$_3$, said composition containing 10 to 50 weight percent solids, said solids consisting essentially of 10 to 70 weight percent colloidal silica and 30 to 90 weight percent of the partial condensate, said composition including a small, catalytic amount of a buffered latent silanol condensation catalyst and a minor proportion, sufficient to promote flow, of a β-hydroxyketone compound; and
   (ii) transporting said film into a zone of elevated temperature sufficient to effect substantially complete cure of the silanol in less than about 120 seconds.

2. A method as defined in claim 1 wherein cure of the silanol is accomplished in less than about 30 seconds.

3. A method as defined in claim 1 wherein said catalyst consists essentially of an alkali metal or quaternary ammonium salt of a monocarboxylic aliphatic acid containing from 2 to 8 inclusive carbon atoms.

4. A method as defined in claim 3 wherein said alkali metal is potassium or sodium and said quaternary ammonium salt includes the cation (R$^1$)$_4$N+ wherein R$^1$ is C$_1$-C$_6$ or mono phenyl substituted C$_1$-C$_6$ alky.

5. A method as defined in claim 3 wherein said catalyst is potassium acetate, tetra(methyl)ammonium acetate or benzyl trimethylammonium acetate.

6. A method as defined in claim 1 wherein said hydroxyketone compound has the structural formula

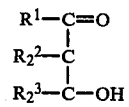

wherein R$^1$ is a monovalent hydrocarbon radical of from 1 to 18 carbon atoms, R$^2$ and R$^3$ are, independently, a monovalent hydrocarbon radical of from 1 to 18 carbon atoms or hydrogen.

7. A method as defined in claim 1 wherein said hydroxyketone compound is diacetone alcohol.

8. A method as defined in claim 1 wherein said aqueous composition also includes a minor proportion of a polysiloxane polyether copolymer.

9. A method as defined in claim 1 wherein the aliphatic alcohol is a mixture of methanol and isobutanol.

10. A method as defined in claim 1 wherein said partial condensate is of CH$_3$Si(OH)$_3$.

11. A method as defined in claim 1 wherein said buffered latent silanol condensation catalyst comprises from about 0.05 to about 5.0 weight percent based on the solids content of said composition.

12. A method as defined in claim 1 wherein in said hydroxyketone compound comprises from about 5 to about 10 weight percent based on the solids content of said composition.

13. A method as defined in claim 1 wherein in said aqueous composition contains from about 18 to about 25 weight percent solids comprising 25–45 weight percent colloidal silica and 55–75 weight percent of the partial condensate.

14. A method for coating plastic films which comprises the steps of
   (i) applying to a moving web of said plastic film an aqueous composition comprising a dispersion of colloidal silica in an aliphatic alcohol-water-solution of the partial condensate of a silanol of the formula RSi(OH)$_3$, wherein R is selected from the group consisting of alkyl having from 1 to 3 carbon atoms and aryl, at least 70 weight percent of the silanol being CH$_3$Si(OH)$_3$, said composition containing 10 to 50 weight percent solids, said solids consisting essentially of 10 to 70 weight percent colloidal silica and 30 to 90 weight percent of the partial condensate, said composition including a small, catalytic amount of a buffered latent silanol condensation catalyst consisting essentially of an alkali metal or quaternary ammonium salt of a monocarboxylic aliphatic acid containing from 2 to 8 inclusive carbon atoms, and a minor proportion, sufficient to promote flow, of a $\beta$-hydroxyketone compound; and (ii) transporting said film into a zone of elevated temperature sufficient to effect substantially complete cure of the silanol in less than about 120 seconds.

* * * * *